United States Patent
Schill-Collberg et al.

(10) Patent No.: US 12,380,133 B2
(45) Date of Patent: Aug. 5, 2025

(54) GRAPH DATABASE SYSTEM WITH PARALLELIZED GRAPH PARTITIONING

(71) Applicant: Neo4j Sweden AB, San Mateo, CA (US)

(72) Inventors: Adam Schill-Collberg, Malmö (SE); Jacob Sznajdman, Gothenburg (SE)

(73) Assignee: Neo4j Sweden AB, San Mateo, CA (US)

( * ) Notice: Subject to any disclaimer, the term of this patent is extended or adjusted under 35 U.S.C. 154(b) by 0 days.

(21) Appl. No.: 18/809,636

(22) Filed: Aug. 20, 2024

(65) Prior Publication Data
US 2025/0077547 A1   Mar. 6, 2025

Related U.S. Application Data

(60) Provisional application No. 63/535,742, filed on Aug. 31, 2023.

(51) Int. Cl.
*G06F 16/28* (2019.01)
*G06F 16/901* (2019.01)

(52) U.S. Cl.
CPC ........ *G06F 16/284* (2019.01); *G06F 16/9024* (2019.01)

(58) Field of Classification Search
CPC .......................... G06F 16/284; G06F 16/9024
USPC ......................................................... 707/736
See application file for complete search history.

(56) References Cited

U.S. PATENT DOCUMENTS

| | | | | |
|---|---|---|---|---|
| 2009/0245085 A1* | 10/2009 | Tao | ........................ | H04L 5/0032 370/208 |
| 2015/0200859 A1* | 7/2015 | Li | ........................ | H04L 41/0895 370/235 |
| 2016/0057629 A1* | 2/2016 | Dong | ...................... | H04L 45/06 370/254 |
| 2022/0329478 A1* | 10/2022 | Mappus | .............. | H04L 41/0668 |

OTHER PUBLICATIONS

Festa et al. Randomized heuristics for the Max-Cut problem. http://www2.ic.uff.br/~celso/artigos/fprr02.pdf. Oct. 27, 2010.

* cited by examiner

*Primary Examiner* — Kuen S Lu
(74) *Attorney, Agent, or Firm* — Van Pelt, Yi & James LLP

(57) ABSTRACT

A method and high-performance apparatus for creating an approximate maximum k-cut of a graph. In various embodiments, nodes and weighted edges in a graph are used to compute a partitioning of a graph such that the edge weight between partitions is maximized. In various embodiments, the method and apparatus use a greedy random construction of cuts for its first approximation, whose solutions are then subject to local search for better solutions, and local path-relinking for the final level of refinement. In various embodiments, one or more of the greedy random construction, local search, and path relinking are parallelized. A novel parallel algorithm is disclosed for perturbing the state of a cut to see if a better one is cheaply available.

20 Claims, 15 Drawing Sheets

GRAPH DATABASE SYSTEM WITH PARALLELIZED GRAPH PARTITIONING

CROSS REFERENCE TO OTHER APPLICATIONS

This application claims priority to U.S. Provisional Patent Application No. 63/535,742 entitled GRAPH DATABASE SYSTEM WITH PARALLELIZED GRAPH PARTITIONING filed Aug. 31, 2023, which is incorporated herein by reference for all purposes.

BACKGROUND OF THE INVENTION

A graph database is a computerized record management system that uses a network structure with nodes, relationships, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Graph databases have various applications. For example, a graph database may be used in recommendations, road or rail transport networks, power grids, integrated circuit design, fraud prevention, and social network systems, to name a few.

It is becoming increasingly common for users of graph databases to want to analyze the entirety of the graph or large sub-graphs, in addition to querying and updating records which has been the mainstay of graph databases over their history. Accordingly, many algorithms exist to aid analysis of large graphs and have been implemented atop graph database systems to help users solve such large graph analytics problems. However, the machinery which implements those algorithms has not always been sufficiently performant, and some are notoriously difficult to performance-optimize.

BRIEF DESCRIPTION OF THE DRA WINGS

Various embodiments of the invention are disclosed in the following detailed description and the accompanying drawings.

DETAILED DESCRIPTION

Figure 1A:
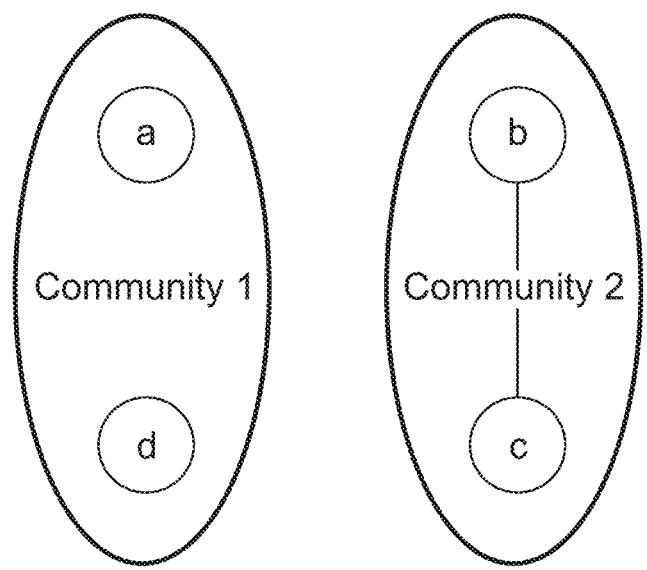
FIG. 1A illustrates an example of a 2-cut of a graph with nodes a, b, c, d to create the communities {a,d} and {b,c}.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to improve on the current state of the art by making approximate max-k cut rapid and accurate enough to be of use for a broad range of graph analytics. In various embodiments, a graph database system as disclosed herein performs parallelized graph partitioning, using two or more threads to perform approximate max-k cut processing in parallel, as disclosed herein, to speed processing without introducing inaccuracies or other shortcomings.

Techniques as disclosed herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles disclosed herein. This disclosure is not limited to any embodiment.

An approach and machinery are disclosed to partition a graph into subgraphs such that the weights of weighted edges that span the partitioned subgraphs is maximized, known as Maximum K-Cut. This method is common in domains like integrated circuit design for rationalizing connections of highly intricate components for a given geometry (the circuit board).

To make the problem tractable, in various embodiments, a system as disclosed herein gives an approximate result. That is, a graph is partitioned into k subgraphs that approximately maximizes the number of relationships that cross from one subgraph (sometimes referred as a "community" of nodes) to another. To make the processing time as rapid as possible, the machinery uses a novel approach, disclosed herein, to enable parallel computation so that the processing work can be spread over many processing units in a computer and executed concurrently to reduce elapsed time.

A k-cut of a graph is an assignment of its nodes into k disjoint communities. A Maximum k-cut is a k-cut such that the total weight of relationships between nodes from different communities in the k-cut is maximized. That is, a k-cut that maximizes the sum of weights of relationships whose source and target nodes are assigned to different communities in the k-cut.

In various embodiments, an approximately maximum k-cut is determined at least in part by performing successive iterations involving one or more of the following: assigning nodes initially at least partly at random, each node being assigned to a selected one of k disjoint communities, e.g., via greedy random construction or other techniques; performing local search to identify nodes that can advantageously be moved to another community to increase the overall value of the initial/current solution (i.e., "local search"); and reassigning nodes based on their assignment in previously determined solutions (i.e., "path relinking").

FIG. 1A illustrates an example of a 2-cut of a graph with nodes a, b, c, d to create the communities {a,d} and {b,c}. In the example shown, in set of nodes a, b, c, d only have one relationship b→c, and it was of weight 1.0. The 2-cut illustrated in FIG. 1A would then not be a maximum 2-cut (with a cut value of 0.0), since the nodes having the sole relationship are within the same community.

Figure 1B:
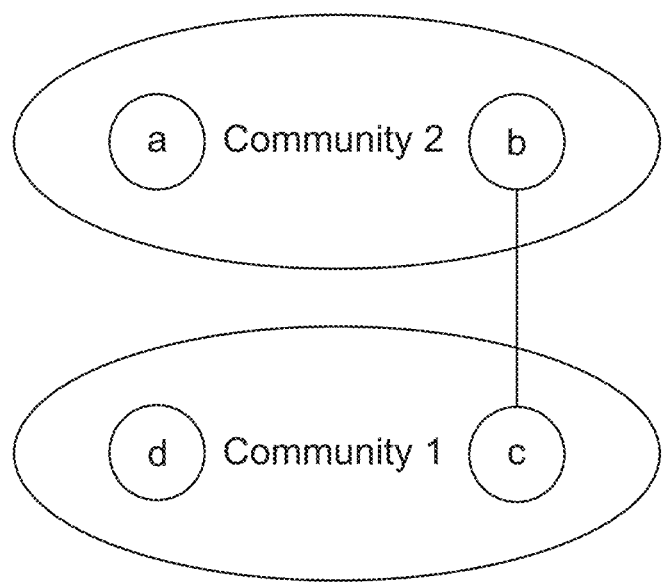
FIG. 1B illustrates an example of an alternative 2-cut with communities {a,b} and {c,d}, which would be a max k-cut with a cut value of 1.0, since the nodes having the sole relationship, i.e., b and c, are assigned to different communities.

FIG. 1B illustrates an example of an alternative 2-cut with communities {a,b} and {c,d}, which would be a max k-cut with a cut value of 1.0, since the nodes having the sole relationship, i.e., b and c, are assigned to different communities.

The following definitions and conventions are used in certain examples and embodiments described herein:

u, v∈V are nodes, S is a community 1. cost (S, v):=$\Sigma_{u\in S\cap N(v)}w(u,v)$; where N(v) is nodes in the neighborhood of node v
2. w(u,v):=weight of edge between u and v
3. Suppose that x is a solution cut $S_1, \ldots, S_k$. Then we set x[v]:=i, if v is in $S_i$ in the x cut.
4. x some solution cut, then w(x):=total cut value of x
5. value (v):=$\max_{i=1, \ldots, k} \Sigma_{j\neq i} \text{cost}(S_j, v)$
6. FREE=0, MOVE=1, BLOCKED=2 are part of an enum
7. boolean compare_and_set(dest, old_val, new_val) is an operation that sets the value at dest to new_val if and only if it currently is old_val, and does all this atomically. It returns true if it successfully set dest to new_val, and false otherwise. (E.g., "compare and swap")
8. The symmetric_difference(x, y) of two solution cuts x, y returns the set of nodes for which the two solutions differ.
9. In various embodiments, for a graph with its node set V relationships and neighborhoods for nodes v in V (represented by N(v)) are globally accessible.

Figure 2:
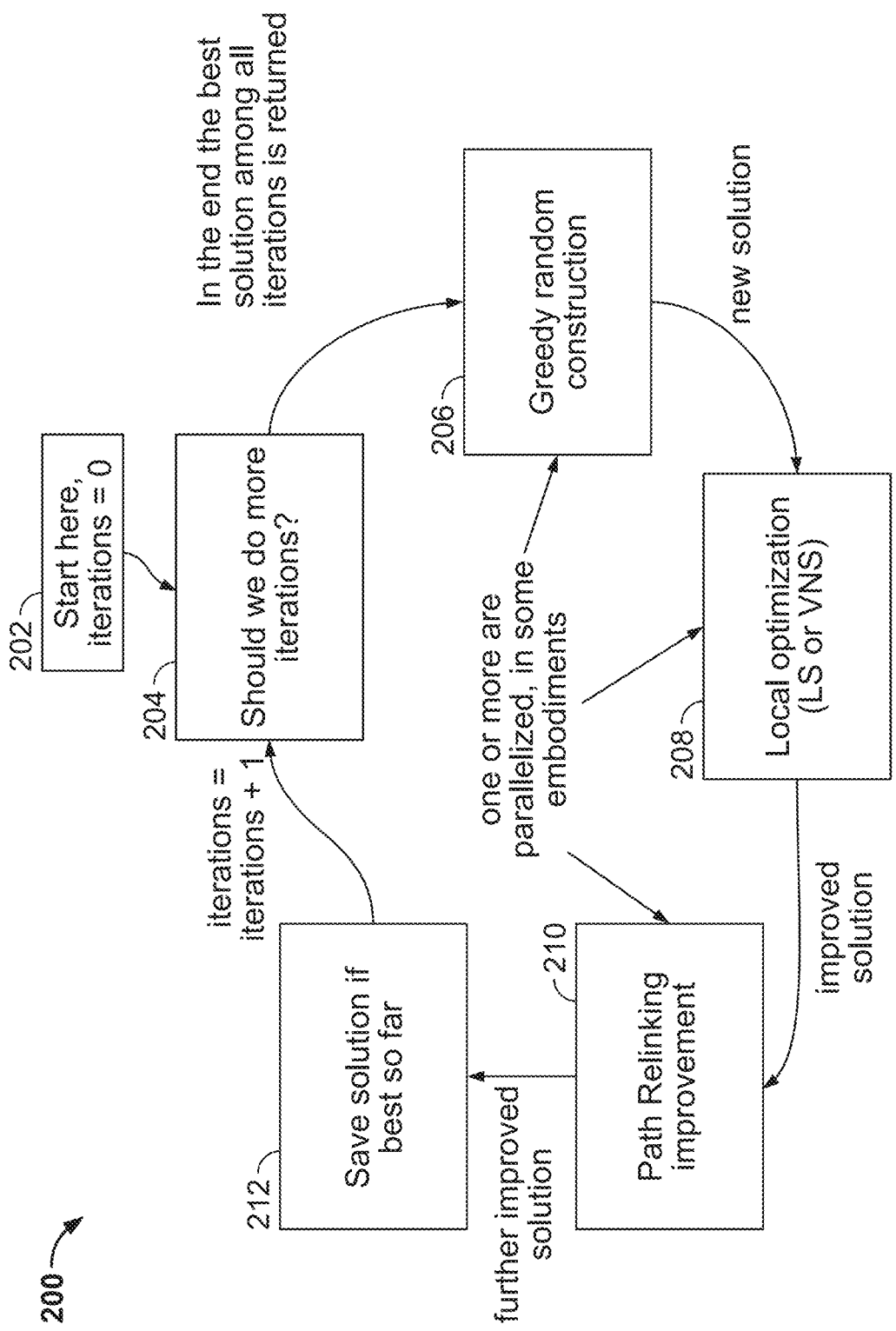
FIG. 2 illustrates an embodiment of a process to perform graph partitioning in an embodiment of a graph database system.

FIG. 2 illustrates an embodiment of a process to perform graph partitioning in an embodiment of a graph database system. In the example shown, workflow 200 performs a user-defined (or otherwise prescribed or determined) number of iterations and saves the highest k-cut that is discovered during those iterations. As such it is not guaranteed to find the theoretical maximum k-cut but will always terminate with a solution. Adding iterations may or may not improve the maximum k-cut found, which is the nature of approximate solutions.

The workflow 200 starts with a first iteration (202, 204) and proceeds to a first processing module and step 206, in which nodes are assigned to communities via "greedy random construction". In various embodiments, greedy random construction aims to construct an initial k-cut such that the cut is somewhat random (and so different every time); the cut is of as high of a value as possible; it can be computed quickly so not to add latency to the execution.

The greedy random construction performed at 206 begins with no assignment of nodes to communities, and then progressively assigns more nodes to communities of the cut. The nodes chosen at any point in time are greedily chosen so that they contribute "as much as possible" to the cut value. The communities they are assigned to are the those currently maximizing the total cut value when assigning this node.

In various embodiments, greedy random construction is performed in a manner such that one or more of the following are achieved:

1. The cut is somewhat random, so it will be different every time
2. The cut is of as high of a value as possible
3. The cut can be computed quickly In various embodiments, at the start of greedy random construction each node has no assignment, and then progressively more nodes are assigned to communities of the cut. The nodes chosen at any point in time are chosen so that they contribute "as much as possible" to the cut value. The communities they are assigned to are the ones currently maximizing the total cut value when assigning this node.

In various embodiments, greedy random construction is performed as described in the following pseudocode:

```
T = V
x[v] = −1 for all v in V
q = 0
while (T != ∅) {
    for (v ∈ T) {
        a = argmaxi=1,...,k Σj≠icost(Sj, v)
        value = maxi=1,...,k Σj≠icost(Sj, v)
        if (value ≥ q) {
            x[v] = a
            Remove v from T
            q = compute_threshold(T)
            break
        }
    }
}
return x
```

In various embodiments, the compute_threshold function in the above greedy random construction pseudocode returns a value that allows nodes which contribute less to the current cut to be filtered out. The compute_threshold function can be, but is not limited to, any of the following:

a chosen percentile of value (v)

for $0 \leq \alpha \leq 1$ returns $\min_{v \in T}(value(v)) + \alpha[\max_{v \in T}(value(v)) - \min_{v \in T}(value(v))]$ $avg_{v \in T}$ (value (v)) (i.e., average value)

$\max_{v \in T}$ (value (v))/2 (half maximum value)

Any reasonable combination of the above, e.g., as determined by practice

In various embodiments, thresholds are used to initially assign nodes to communities in a greedy manner. For example, thresholds may be used to ensure the system performs operations that are among the most beneficial in terms of overall cut improvement given the current computed costs and values. To know what those operations are, thresholds are computed, in various embodiments, based on statistics on all costs and/or values that have been observed in the current iteration. As assignments/moves are considered, the thresholds are used to filter out the less beneficial operations, so that only more beneficial operations are performed. A threshold could for example be the average value of all possible operations, in which case the system would not consider performing any operations that are worse than average.

In various embodiments, the cost function in the greedy random construction algorithm is defined as the sum of the weights of the edges between two nodes where one node is both in the current community and in the neighborhood of the other node.

Figure 3:
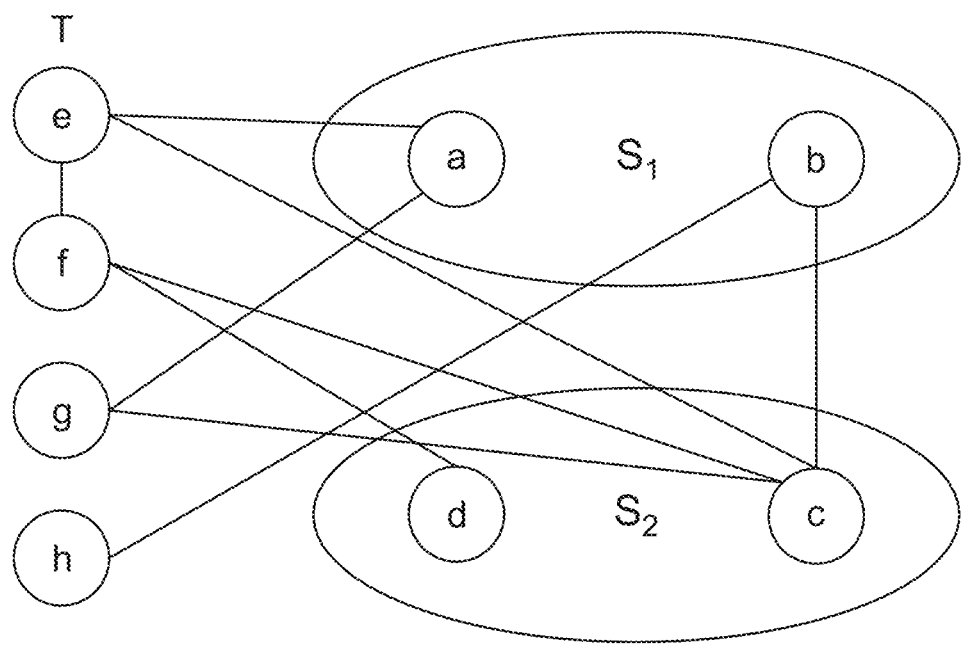
FIG. 3 illustrates an example of greedy random construction as performed in an embodiment of a graph database system.

FIG. 3 illustrates an example of greedy random construction as performed in an embodiment of a graph database system. In the example shown, a greedy random construction of nodes T to communities $S_1$ and $S_2$ is shown in progress. The remaining nodes in T may be assigned according to the pseudocode above, e.g., based on the costs as shown in table 302. For example, the nodes e and/or g may be assigned randomly to $S_1$ or $S_2$, since the cost (addition/subtraction of value) is the same for either, or f may be assigned to $S_1$ or h to $S_2$, which are lower cost assignments in the example and state as shown.

Referring further to FIG. 2, the next stage the maximum k-cut process 200 is local optimization step/module 208, in which a possible solution (e.g., produced by greedy random construction) is locally optimized, e.g., via Local Search (LN) with or without Variable Neighbor Search (VPN). The local optimization process and/or module iterates over the node set for a given community and checks if the cut value would be increased by assigning the node to another community. When a node is reassigned, in some embodiments, the process restarts since the neighbors of a reassigned node will have their costs updated and may themselves be potentially eligible for reassignment to other communities.

To check opportunistically for better local solutions, the nodes can be perturbed, and the local search is run again. In various embodiments, such perturbation followed by running local search again is referred to as "variable neighborhood search" or VPN. For a given perturbation, a better locally optimal solution may be found.

In various embodiments, local search (optimization) is performed as described in the following pseudocode:

Algorithm LS(x):

```
change = true
while (change == true) {
    change = false
    for (v ∈ V) {
        i* = argmini=1,...,k cost(Si, v)
        min_cost = mini=1,...,k cost(Si, v)
        j = x[v]
        if (cost(Sj,v) > min_cost) {
            x[v] = i*
            change = true
            break
        }
    }
}
```

Referring further to FIG. 2, once the local search phase 208 (with any perturbation) has been completed, the workflow 200 moves into the path-relinking stage 210. In path relinking, a good solution is progressively made more like another known good solution.

In various embodiments, path relinking is performed as described in the following pseudocode:

Algorithm PR(x, elite_sets):

```
pick z at random from elite_sets
J = symmetric_difference(x, z)
x*, y = x
while (size(J) > 1) {
    v* = argminv∈J (cost(Sz[v], v) − cost(Sy[v], v))
    y[v*] = z[v*]
    if (w(y) > w(x*)) {
        x* = y
    }
    Remove v* from J
}
Add x* to elite_sets
return x*
```

Figure 4A:
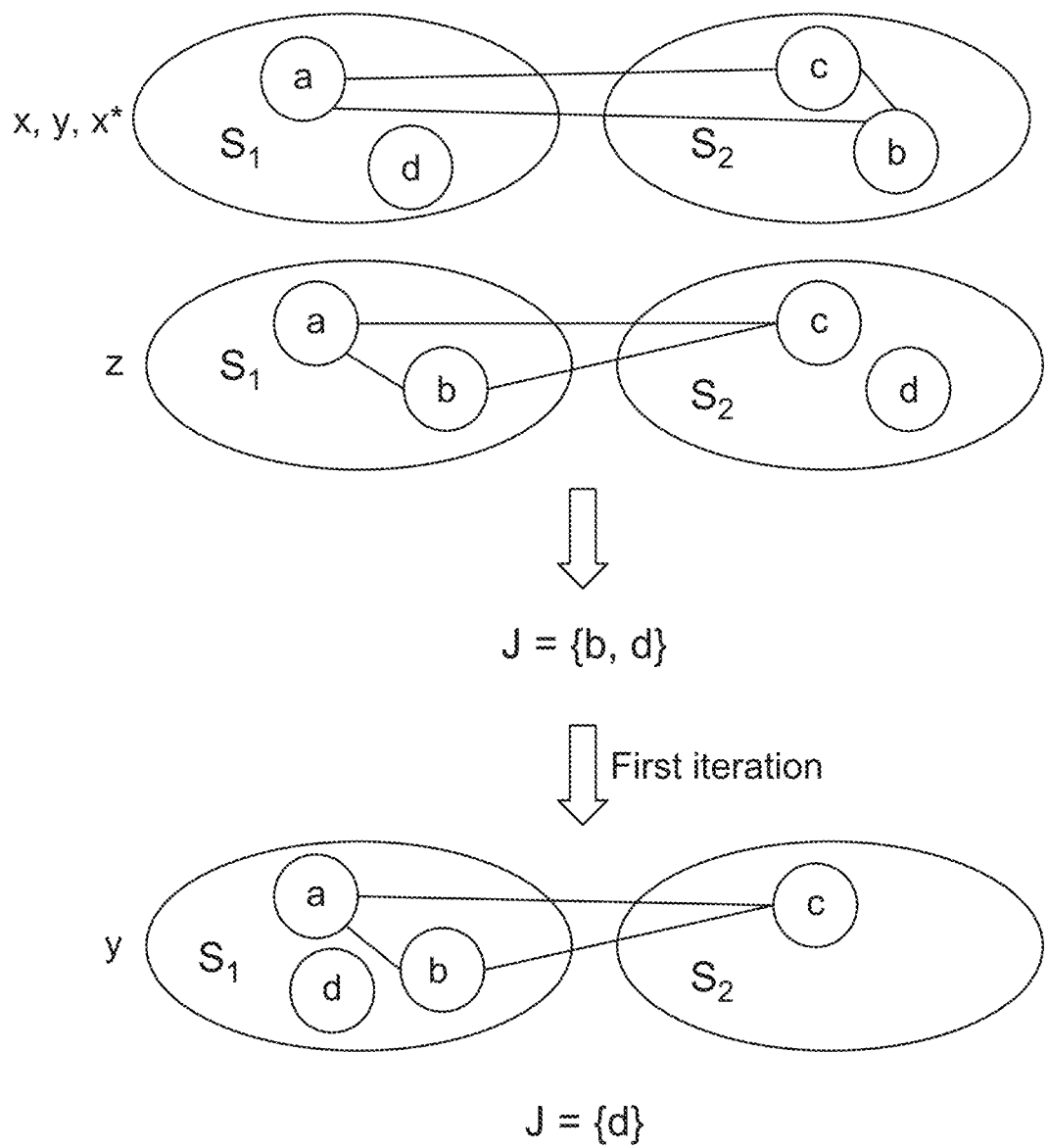
FIGS. 4A and 4B illustrate examples of path relinking as implemented in an embodiment of a graph database system, where x, y, and x* are initially all the same solution.
Figure 4B:
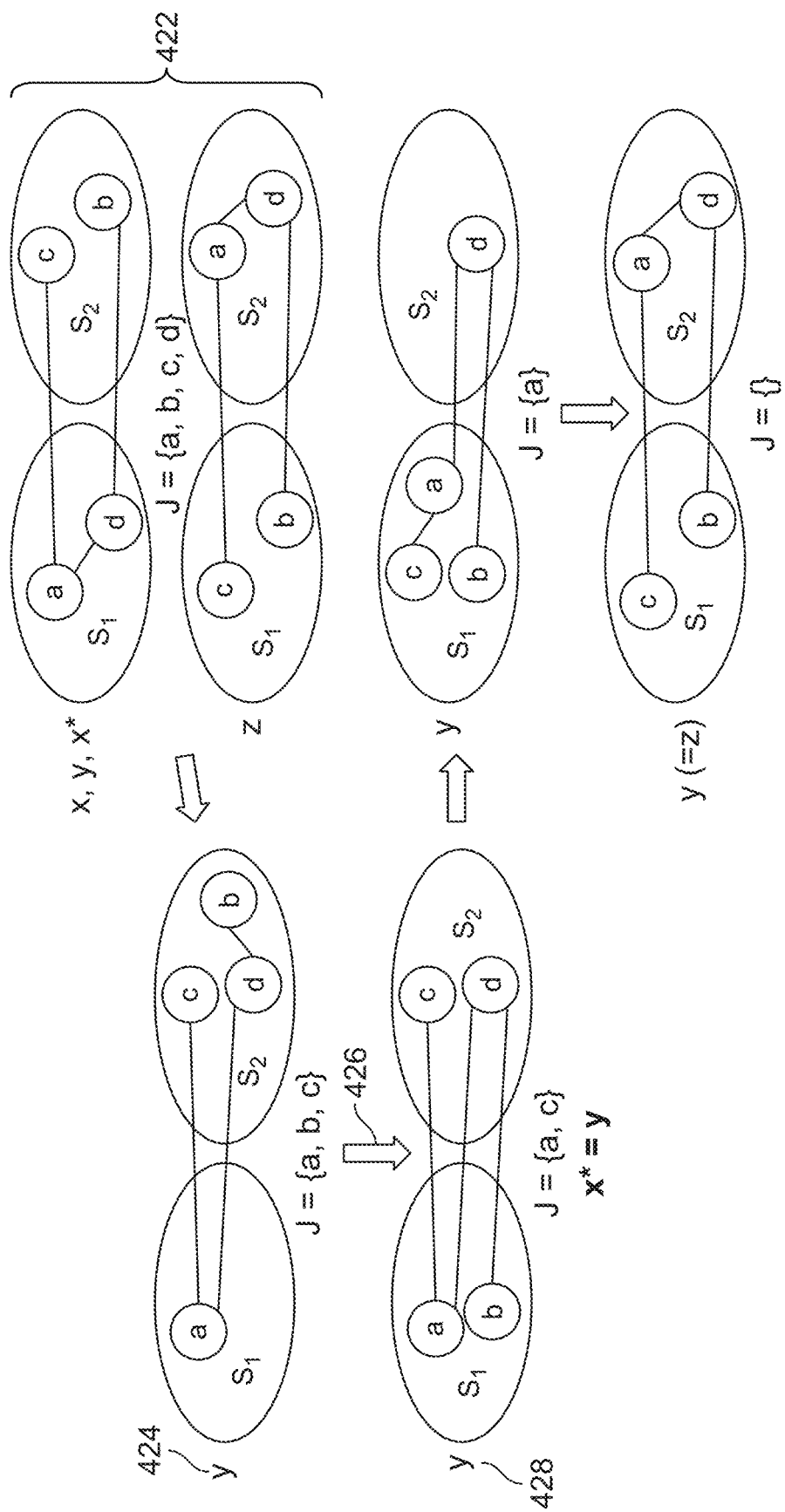

FIGS. 4A and 4B illustrate examples of path relinking as implemented in an embodiment of a graph database system, where x, y, and x* are initially all the same solution. x will always be this same original solution in the procedure, while y will be successively updated to resemble the solution z more closely. The algorithm relinks x to produce y, which is like a path (combination) of x and z, hence the term "path relinking". x* is updated to be equal to the current state of y when y is better than the original x.

In FIG. 4A, an iteration of path relinking is illustrated whereby solution x is relinked to with solution z to produce a solution y. If solution y is found to be an improvement, then it is stored as solution x* and the machinery continues to try to make solution y more like solution z with the aim of improving y.

In FIG. 4B, successive iterations of path relinking are illustrated. In the first iteration 422, the solution y 424 is not an improvement, since the same number of relationships cross communities, i.e., two. However, a second iteration 426 produces a solution y 428 that increases the value of the cut, from v=2 to v=3, resulting in y 428 being stored as the new x*. In the foregoing iteration 426, b was moved from $S_2$ to $S_1$ while keeping d in $S_2$, making the solution y 426 more like the previous good solution z in this regard while also resulting in a higher value cut. In the example shown in FIG. 4B, the final two iterations produce results that would be less optimal than y 428, with the result that no further y is stored as x*.

Note that path relinking cannot happen on the first pass of the overall maximum k-cut algorithm since the set of known good solutions is, by definition, empty on the first iteration as no solutions have been computed.

On the second iteration of the algorithm, path linking has exactly one good known good solution (computed in the first iteration) from which to choose and will try to make the current solution closer to it. In subsequent iterations, path linking will choose any known good solution at random from those computed in prior iterations and attempt to make the current solution similar.

Once sufficient iterations have been completed, the path relinking process can be completed by delivering a result back to its caller.

Up until this point, the description of the process and machinery has focused primarily on serial execution such that the major units and their behavior can be readily understood. However, in various embodiments, one or more of the following are parallelized for performance so that its workload can be run on many computer processors simultaneously to reduce execution time: computing costs, values, and/or thresholds; greedy random construction; local optimization (e.g., local search); and path relinking.

To support efficient parallel execution, in various embodiments, the parallel implementation of one or more of the above does not restart every time a node is swapped between a partition as the serial versions did. This has the beneficial side-effect that the parallel algorithms are faster even when they are run on a single thread on a single computer processor just like the serial version.

In various embodiments, a new processing module and framework, referred to sometimes as "PAPIG", are provided to assign nodes to communities in parallel.

Figure 5:
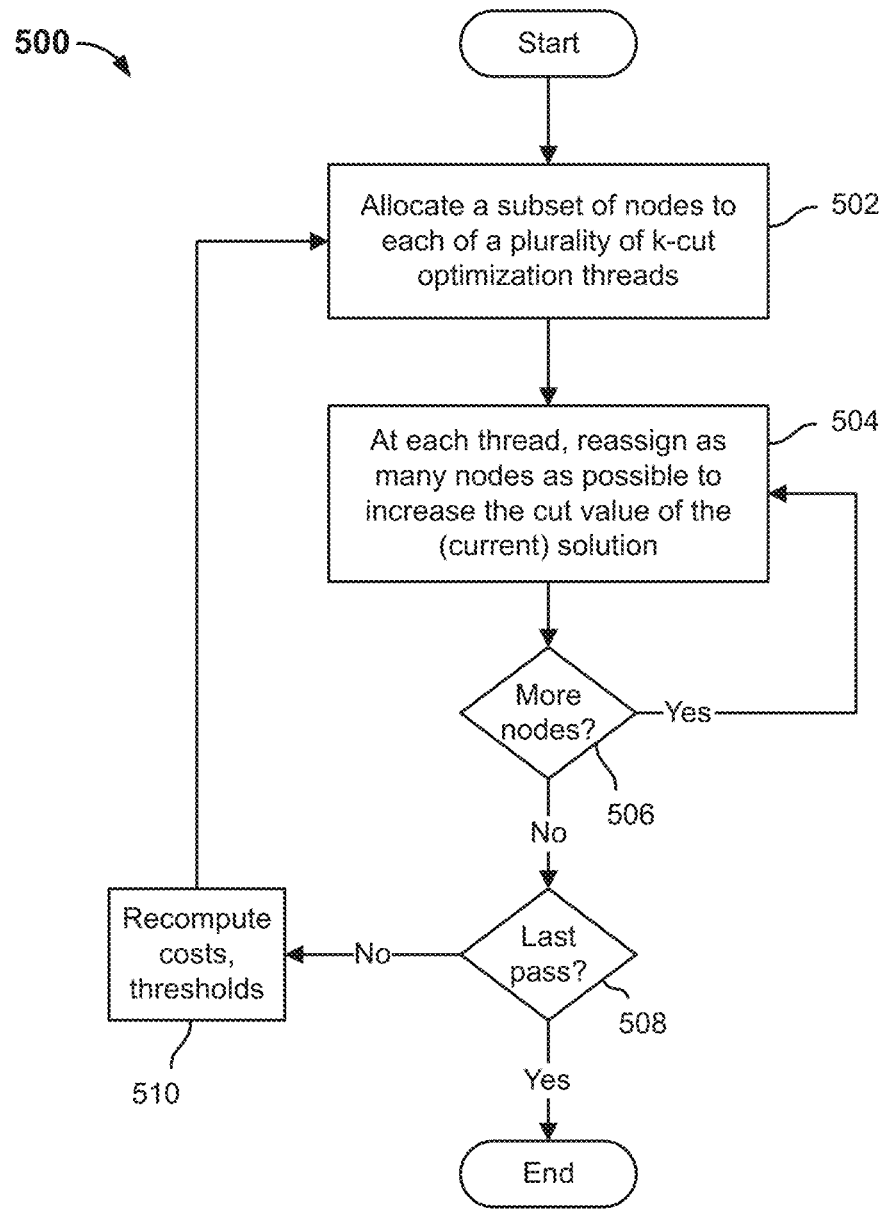
FIG. 5 is a flow chart illustrating an embodiment of a process to perform graph partition processing in parallel.

FIG. 5 is a flow chart illustrating an embodiment of a process to perform graph partition processing in parallel. In various embodiments, the process 500 of FIG. 5 is performed by a graph database system. In the example shown, at 502, a different, non-overlapping subset of nodes comprising a graph is allocated to each of a plurality of processing threads. In some embodiments, the threads may pull nodes for processing from a shared queue. At 504, each thread operates independently and in parallel to reassign as many nodes as possible to increase the cut value of the current solution. Each thread continues such processing until there are no further nodes to be processed (504, 506). If all nodes have been processed, it is determined at 508 whether the pass just completed is the last pass. For example, if the last pass resulted in an improved (higher value) cut, or a cut that improved the value by at least a prescribed threshold, then a further pass may be performed. If a further pass is performed (508), then at 510 one or more of costs, values, and thresholds are recomputed, and the next pass is performed as described above for the previous pass (i.e., 502, 504, 506, and 508). Once the last pass has been completed (508), the process ends.

Figure 6:
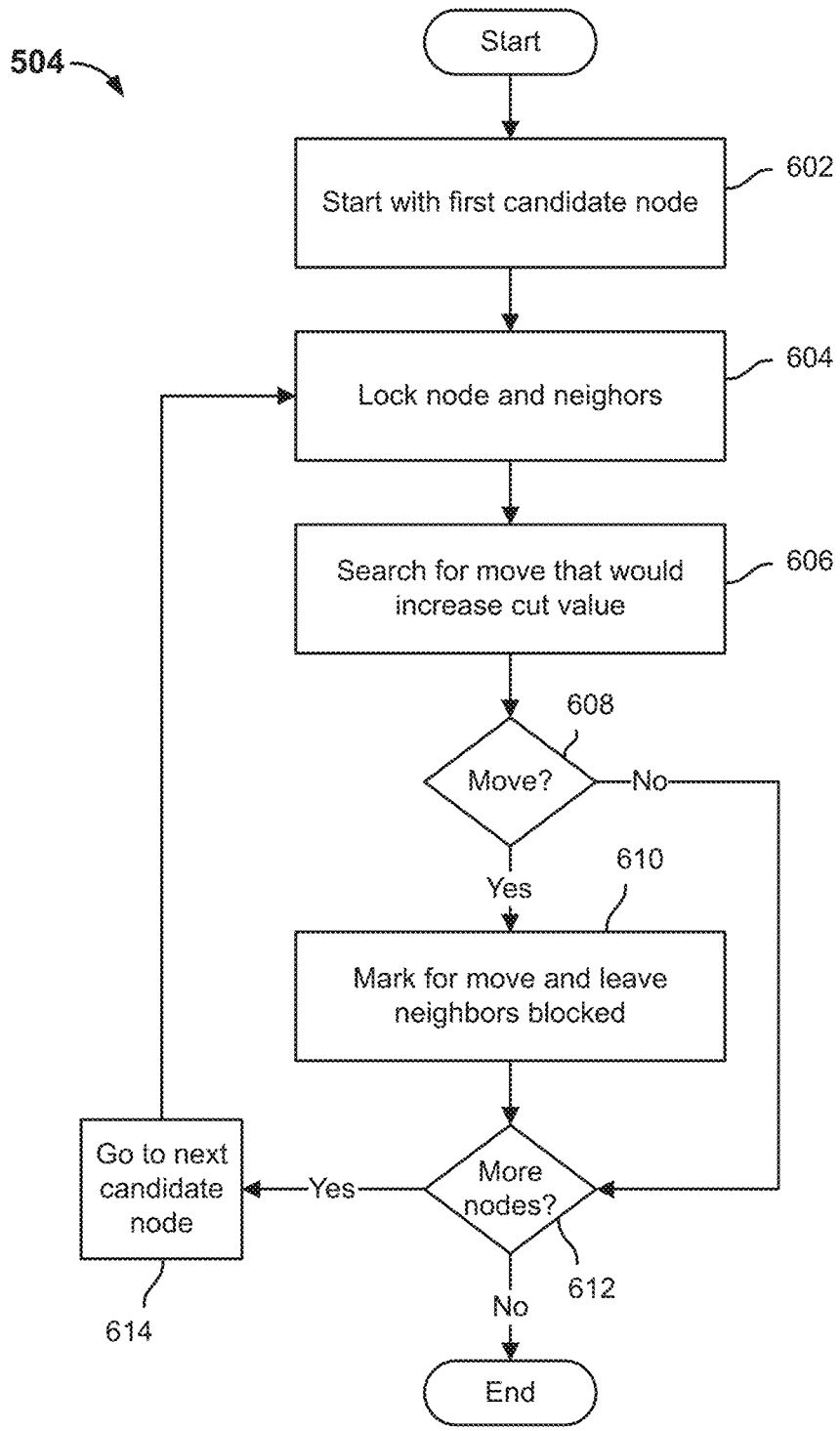
FIG. 6 is a flow diagram illustrating an embodiment of a process to reassign nodes in parallel with one or more other threads.

FIG. 6 is a flow diagram illustrating an embodiment of a process to reassign nodes in parallel with one or more other threads. In various embodiments, the process of FIG. 6 is performed by each of a plurality of threads assigned to perform step 504 of FIG. 5. In the example shown, starting with a first node (602), the thread locks the node and (attempts to lock) its neighbors (604). The thread then searches for a move that would increase the cut value (606). If such a move is found (608), the thread marks the node to be moved and leaves its neighbors blocked. If more nodes remain to be processed by the thread (612), the node moves on to consider a next node (614) and a further iteration of the process of FIG. 6 is performed with respect to that node. Subsequent iterations are performed until no further nodes remain to be processed, e.g., by that thread.

In various embodiments, parallelized Greedy Random Construction is performed, which encompasses parallel cost and threshold computations.

Figure 7:
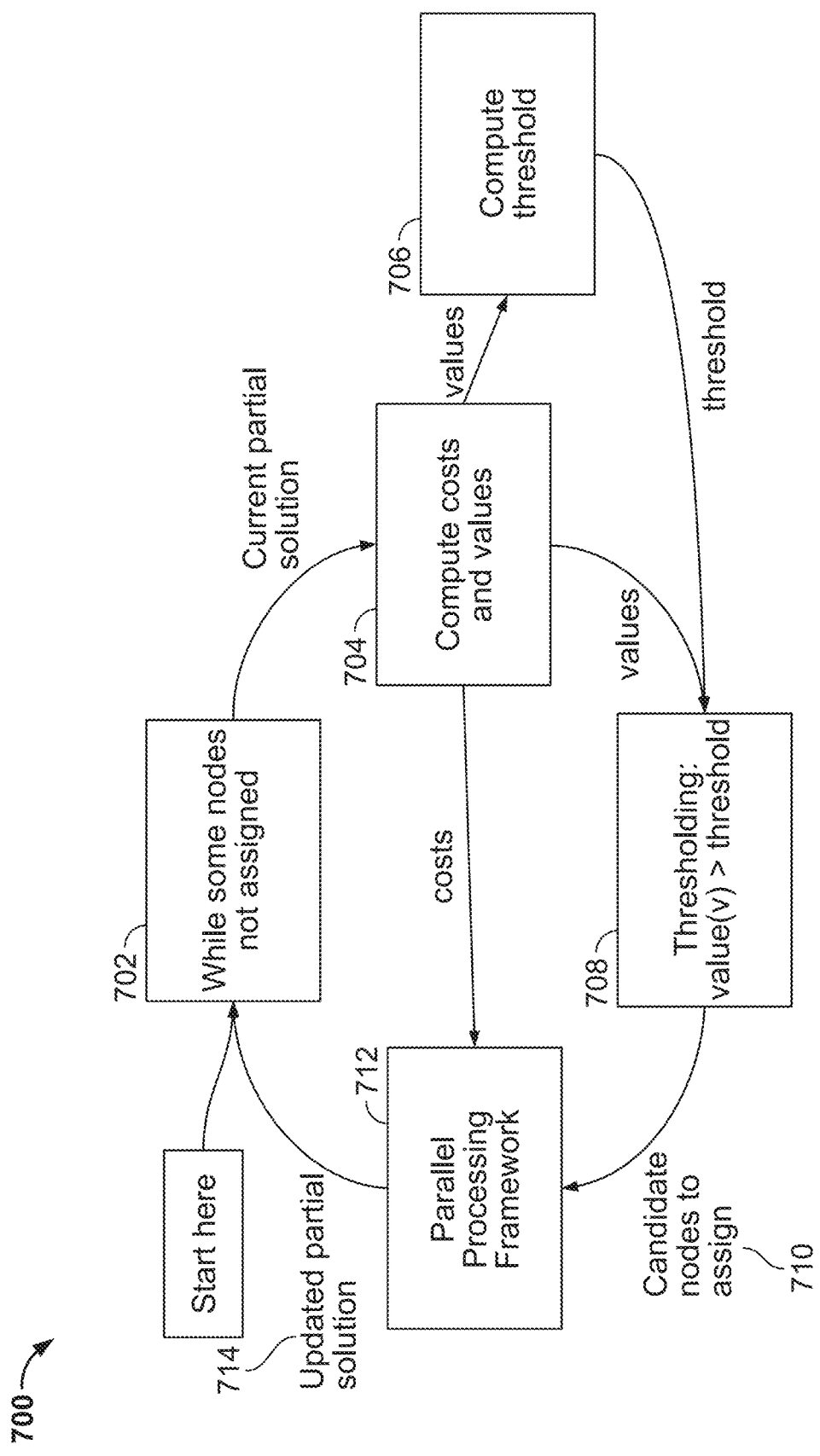
FIG. 7 is a functional flow diagram illustrating a system and process to perform Greedy Random Construction in parallel.

FIG. 7 is a functional flow diagram illustrating a system and process to perform Greedy Random Construction in parallel. In some embodiments, each of a plurality threads performs the process 700 of FIG. 7, each with respect to a subset of nodes comprising a graph. For example, a supervisory process may assign non-overlapping subsets of nodes to each of a plurality of threads. Or, alternatively, each thread may pull nodes or groups of nodes for processing, such as from a common queue.

In the example shown in FIG. 7, the process 700 continues while nodes remain to be assigned to a community (702). Cost and values (704) and thresholds (706) are computed based on a current partial solution. Thresholding is performed (708) to determine candidate nodes to assign (710). Parallel processing framework (module, algorithm, etc.) 712 manages assignment of nodes to communities, by multiple threads working in parallel, to produce an update partial solution 714, which then becomes the new "current partial solution" for a next iteration of process 700.

In various embodiments, cost and value calculations. e.g., as performed in connection with process 700 of FIG. 7, are performed in parallel as described by the following pseudocode:

Algorithm Parallel_GRC(thresholding_settings):

```
move_status atomic array of length |V|
x array of length |V|
for v in V
    x[v] = -1
    possible_edits[v] = {1,2,...,k}
T = V
while (non_empty(T)) {
    costs, values = compute_costs_and_values_grc(x)
    fnodes =
        threshold_nodes(T, thresholding_settings, values)
    Assign partitions of fnodes to threads
    set_all(move_status, FREE)
    each thread do {
        PAPIG(possible_edits, fnodesthread,
            costs, move_status, x)
```

-continued

```
    }
    T = {v | x[v] == -1}
}
return x
```

In various embodiments, costs and values are computed in parallel, as described in the following pseudocode (e.g., for the function "compute_costs_and_values_grc(x)" in the above pseudocode):

```
compute_costs_and_values_grc(x)
// table of shape size(V) by k, initialized with all 0's
costs
// array of length size(V)
values
for v in V { // do this parallel
    if (x[v] != -1) continue
    total = 0
    for u in N(v) {
        if (x[u] == -1) continue
        costs[v][x[u]] += w(u, v)
        total += w(u, v)
    }
    value[v] = total - mini(costs[v][i])
}
return costs, values
```

In some embodiments, the parallelized for-loop in the pseudocode above processes all nodes concurrently (e.g., within the limits of the available parallelism from the underlying computer processors). Once computed, the costs and values are returned to the parent function (see pseudocode for parallelized Greedy Random Construction above) where thresholds are computed for free nodes (those nodes which are movable). The system then proceeds to divide the nodes in the graph amongst the available processors and executes the parallel processing framework (sometimes referred to as "PAPIG") to determine an updated/current partial node assignment solution.

In various embodiments, a parallel processing framework (e.g., PAPIG) as disclosed herein is implemented as described in the following pseudocode:
Algorithm PAPIG (possible_edits, nodes, costs, atomic move_status, x):

```
for (v ∈ nodes) {
    if (possible_edits[v] == ∅) {
        continue
    }
    skip v if current assignment is possible and optimal
    if (!compare_and_set(move_status[v], FREE, MOVE) {
        continue
    }
    for (u ∈ N(v)) {
        if (!compare_and_set(move_status[u], FREE, BLOCKED)) {
            if (move_status[u] == MOVE) {
                move_status[v] = BLOCKED
                break
            }
        }
    }
    if (move_status[v] == MOVE) {
        // Likely cached in practical implementations
        x[v] = argmini ∈ possible_edits[v]costs[v][i]
    }
}
```

Figure 8:
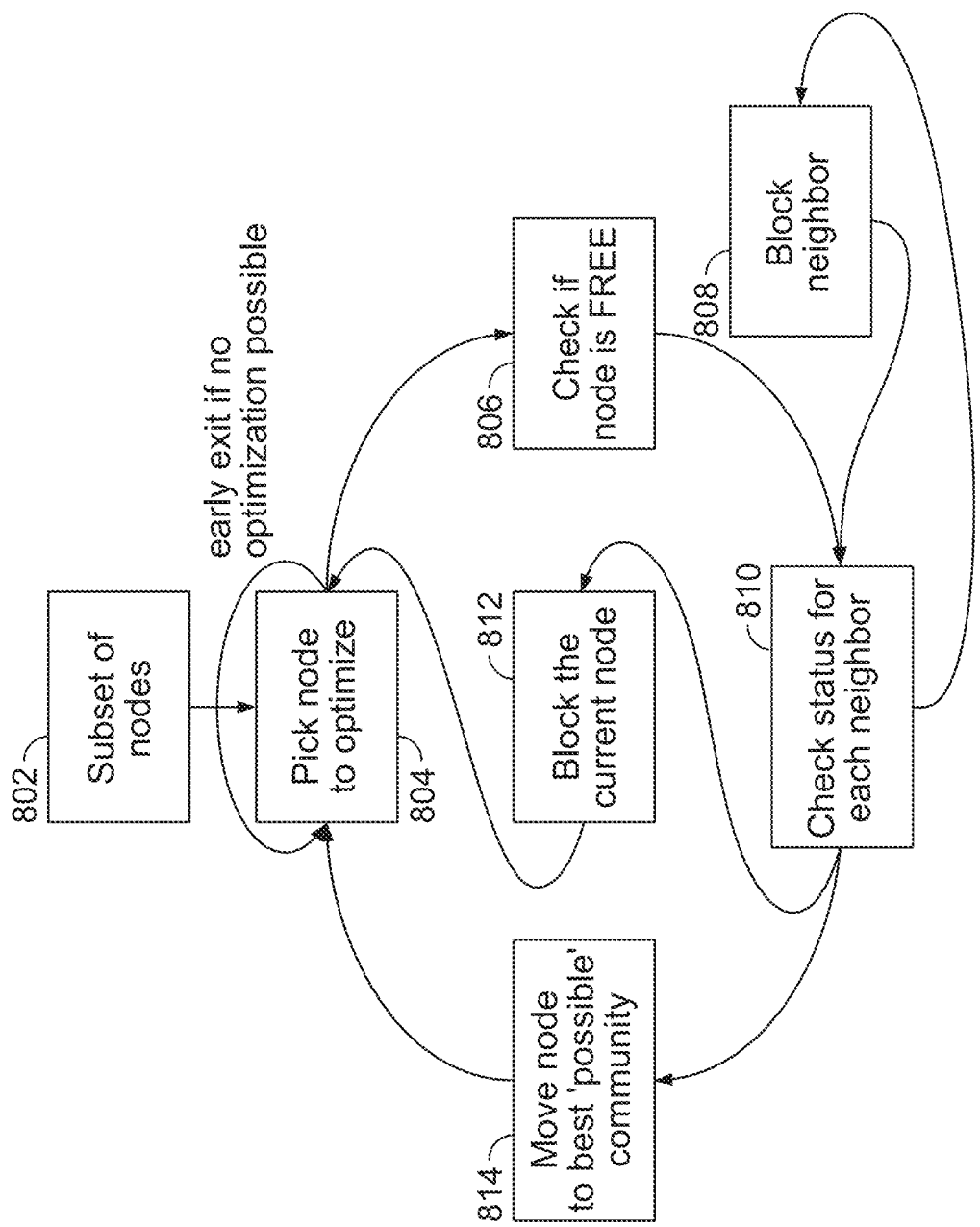
FIG. 8 illustrates an example of a parallel processing framework (e.g., PAPIG) as implemented in various embodiments.

FIG. 8 illustrates an example of a parallel processing framework (e.g., PAPIG) as implemented in various embodiments. The entry point to the function "subset of nodes" 802 is where some partition of nodes to be processed is injected. It can come from a work queue, a static partition or any other function that can reasonably subset the nodes from the graph into approximately equal units of work.

For each worker, a node is picked from its currently allocated working set to optimize (804). From there if the node is free to be moved (806) then its neighbors are blocked (if possible) (808, 810) until either the current node is also blocked (812), or it is moved to the best possible community (814) before proceeding to the next node from its allocated working set.

In various embodiments, Parallelized Local Search is performed as described by the following pseudocode:
Algorithm Parallel_LS(x):

```
change = true
for all v {
    possible_edits[v] = [1..k] // this can be represented compactly
    in practice
}
move_status atomic array of length len(nodes)
assign partitions of V to threads
while (change == true) {
    change = false
    costs = compute_costs_ls(x)
    set_all(move_status, FREE)
    each thread do {
        PAPIG(possible_edits, V_{thread}, costs, move_status, x)
    }
    if x was updated, set change := true
}
```

In various embodiments, costs are computed in parallel for local search as described by the following pseudocode:

```
compute_costs_ls(x)
costs // table of shape size(V) by k, initialized with all 0's
for v in V { // parallel
    for u in N(v) {
        costs[v][x[u]] += w(u, v)
    }
}
return costs
```

Figure 9:
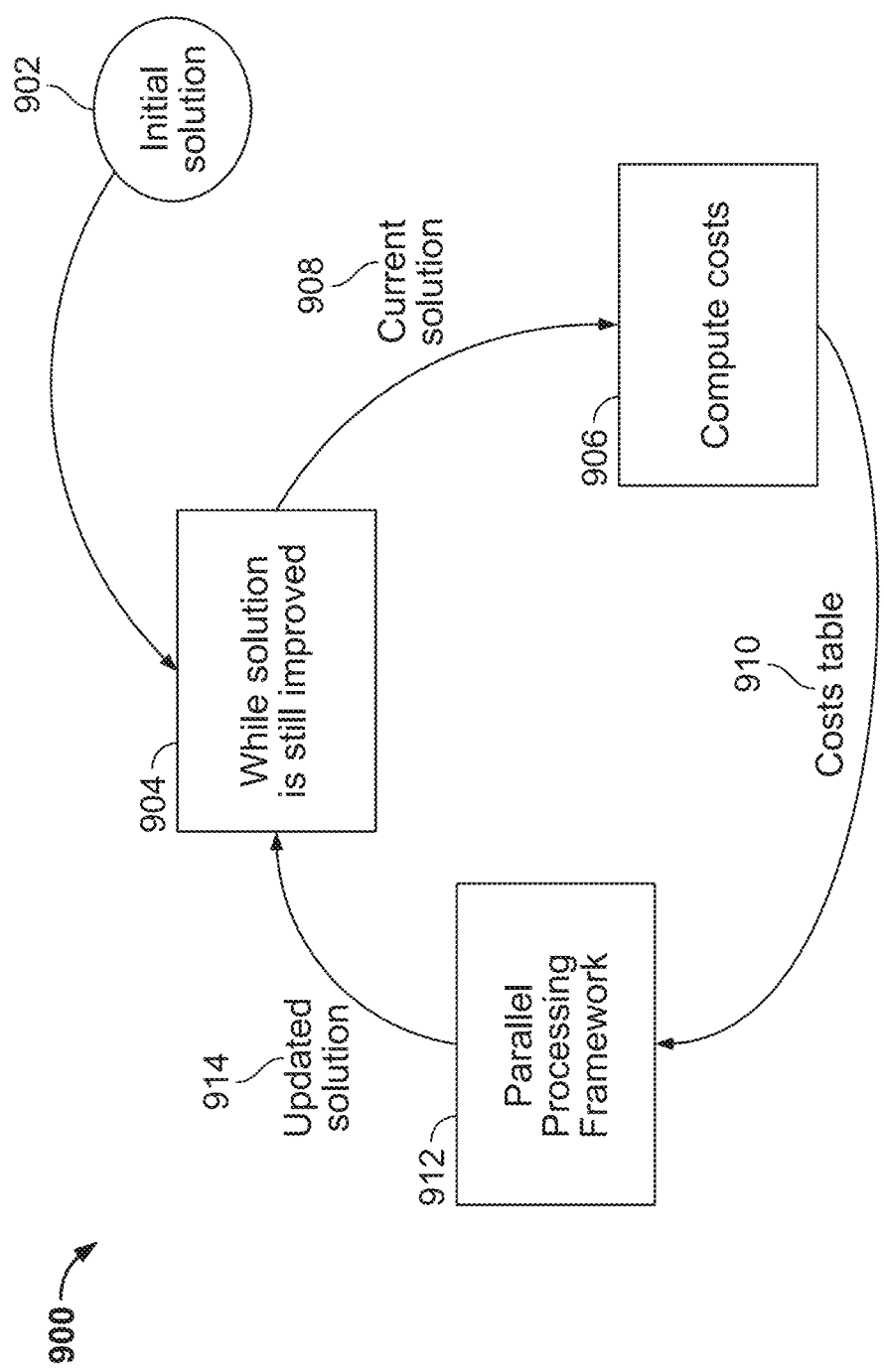
FIG. 9 illustrates an embodiment of a process to perform Parallelized Local Search.

FIG. 9 illustrates an embodiment of a process to perform Parallelized Local Search. The process 900 is like the serial version described above, but a parallel processing framework is used to change the cut allowing data parallelism across multiple computers processors to enhance performance. In the example shown, process 900 starts with an initial solution 902, e.g., an initial solution generated by Greedy Random Construction, and while the solution is still able to be improved (904) costs are computed 906 for the current solution 908 to produce a costs table 910, which is provide to the parallel processing framework 912. Multiple threads operate in parallel, using parallel processing framework 912 to produce an updated solution 914, which becomes the new "current solution" 908 for a next iteration of the process 900, so long as the solution is still being improved 904.

FIGS. 10A through 10H illustrate an example of Parallel Local Search as implemented in various embodiments. In the example shown, for purposes of illustration the nodes comprising the graph as shown are assigned to two communities, $S_1$ and $S_2$, by two (or more) processing threads operating in parallel.

Figure 10A:
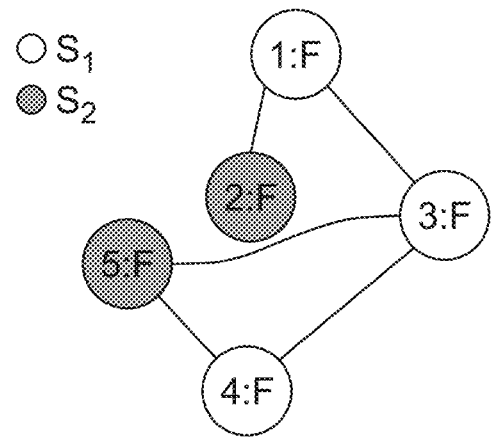
FIGS. 10A through 10H illustrate an example of Parallel Local Search as implemented in various embodiments.

Referring first to FIG. 10A, the Parallel Local Search process starts with two partitions ($S_1$, $S_2$) and all nodes in the graph are free to be moved, as indicated by the letter "F" shown for each node. The value of the node cuts is shown in the "Cost table" and any edits (changes to the topology of the graph) are collected in the table called "Edits".

Figure 10B:
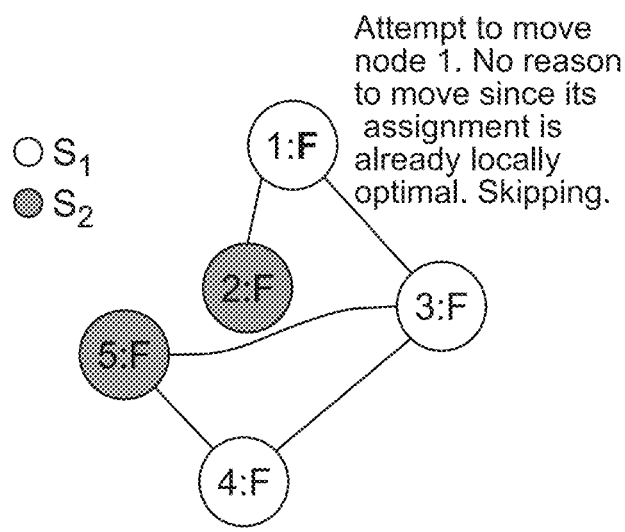
Figure 10C:
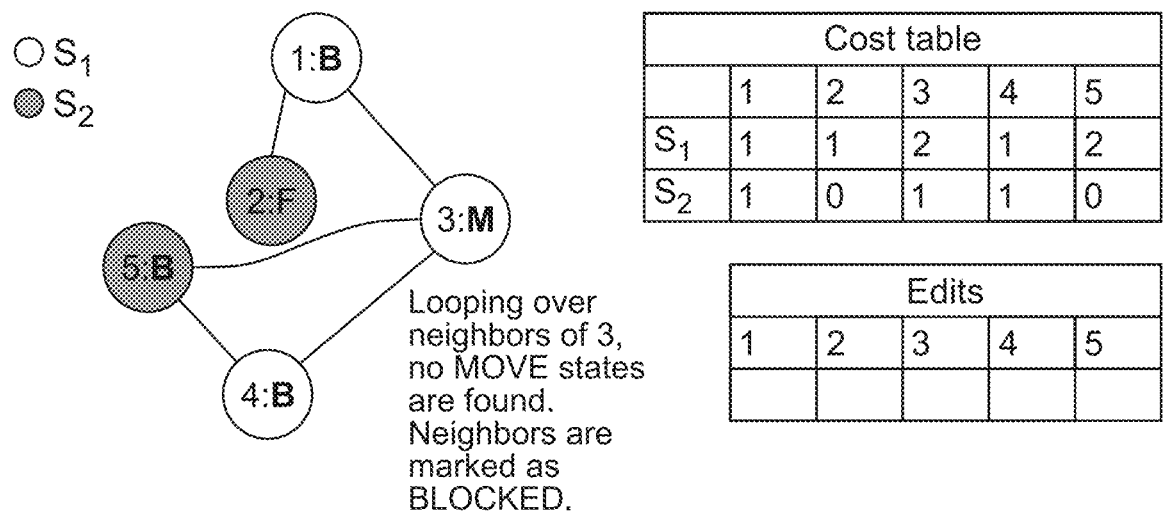

In the absence of contention (multiple worker threads), the local search process operates as shown in FIG. 10B. The process first chooses a node to optimize which, in the example shown in FIG. 10B, is node 1. It is found that node 1 is locally optimal since moving it from $S_1$ to $S_2$ does not change its cost, and so the node is skipped.

The process then chooses another node to optimize. In the example shown in FIG. 10C, node 3 is chosen and its neighbors (i.e., nodes 1, 4, and 5) are iterated over. In doing so the process finds that the neighborhood of node 3 is comprised of nodes in state FREE and that the cost for node 3 to stay in cut $S_1$ is higher than the cost of moving it to $S_2$. This is intuitive: Node 3 has two links to nodes in $S_1$ but only one link to a node in $S_2$ and more links between rather than within partitions is better.

Figure 10D:
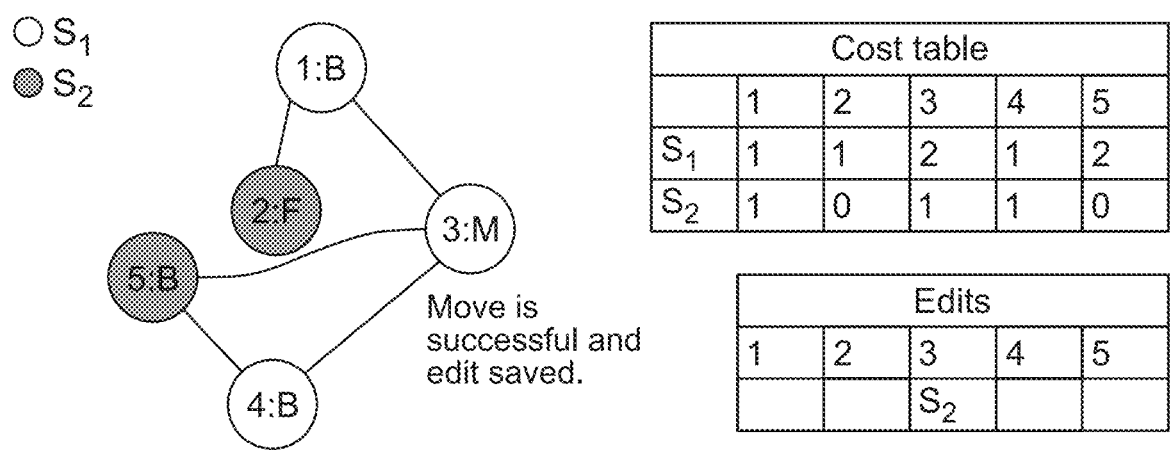

Based on the neighborhood state, a local decision to move Node 3 is made, as illustrated in FIG. 10D, meaning that nodes 1, 4, and 5 which are atomically moved from FREE state to BLOCKED to lock down the network around Node 3 and then node 3 is marked MOVE which is recorded in the edits for the cuts as shown in FIG. 10D.

In the single-threaded case exemplified in FIGS. 10A through 10D, the local search process is unencumbered by other threads running copies of the same instructions. This makes things descriptively clear, but to achieve improved performance more threads are needed so that computational work can be executed on multiple computer processors in parallel.

The trade-off is that threads may now interfere with each other's local decisions causing contention. Contention is the enemy of both performance and correctness. What follows is a set of descriptions and examples showing how the algorithm behaves correctly and performantly under parallel operation is presented.

Figure 10E:
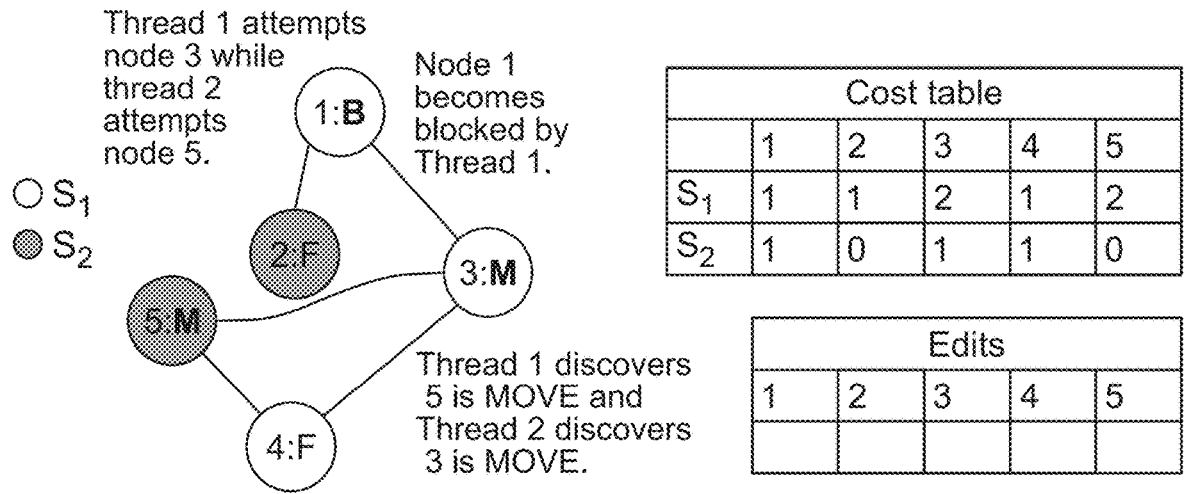
Figure 10F:
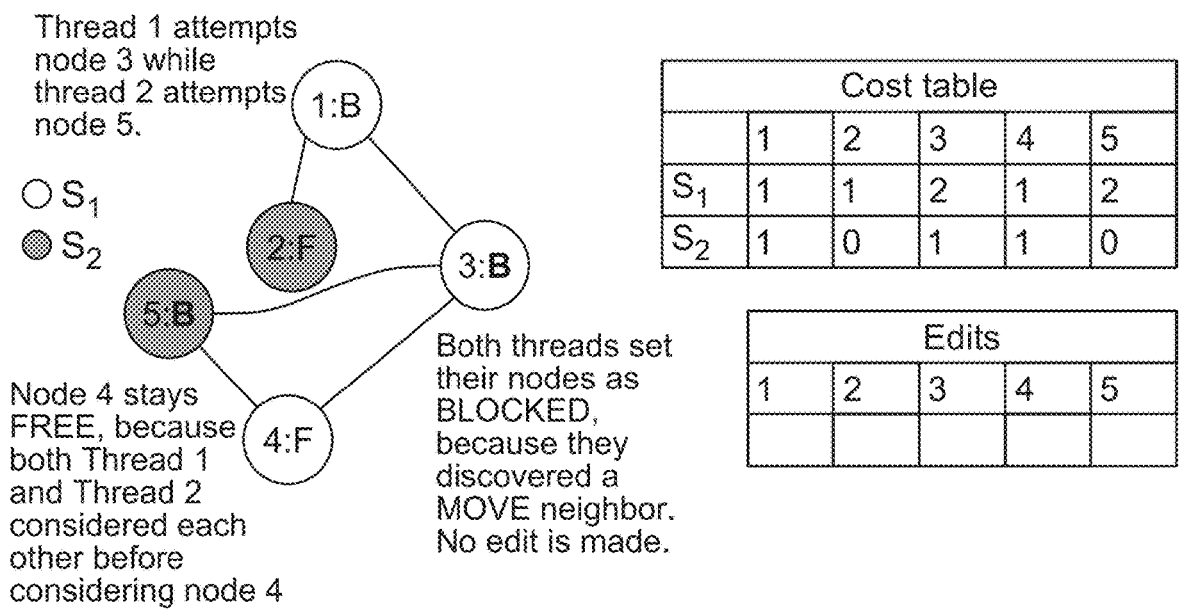

In the example shown in FIG. 10E, two threads are working concurrently. Thread 1 accesses node 3 and iterates its neighbors. It marks node 3 to be moved and then considers node 5. However, in this example, by the time Thread 1 considers node 5, Thread 2 has already accessed node 5 and marked it to be moved. At this point there is contention: in various embodiments, parallelized local search process as disclosed herein prohibits nodes being moved if they are not topologically surrounded by nodes that won't move. Since both node 3 and node 5 have been marked to move, in this example, neither will be moved (at least in this iteration). Specifically, Thread 1 marks node 3 as blocked and Thread 2 does the same to node 5, as shown in FIG. 10F. For both threads, the node under consideration to be moved has been blocked. This terminates the iteration leaving node 4 labelled free. No nodes change their cut as shown in FIG. 10F.

While the outcome in FIG. 10F is safe and correct, the more common case is that nodes change their cut even under parallel activity. To do otherwise would render parallelized local search processing pointless. Revisiting the situations in FIG. 10E and in FIG. 10F, had the timings been different, the threads of execution would have behaved differently, as illustrated by FIGS. 10G and 10H.

Figure 10G:
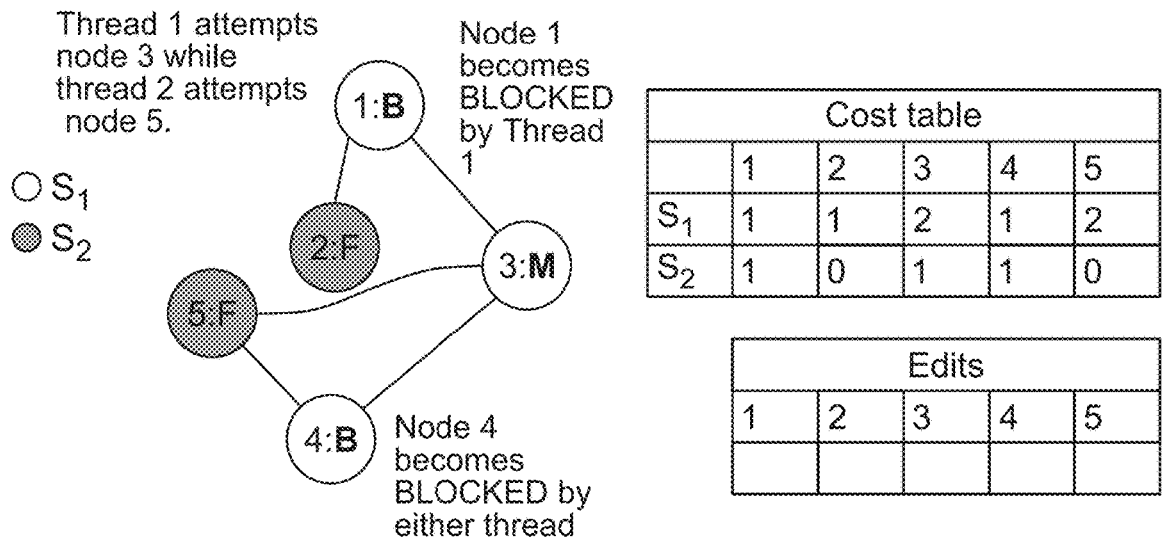

Referring first to FIG. 10G, in this example Thread 1 attempts to move node 3 and blocks node 1 in preparation. Concurrently Thread 2 attempts to move node 5 but has not yet marked it to MOVE. Either thread can then visit node 5 and mark it as blocked, i.e., because node 3 is marked to MOVE (this is an idempotent operation).

Figure 10H:
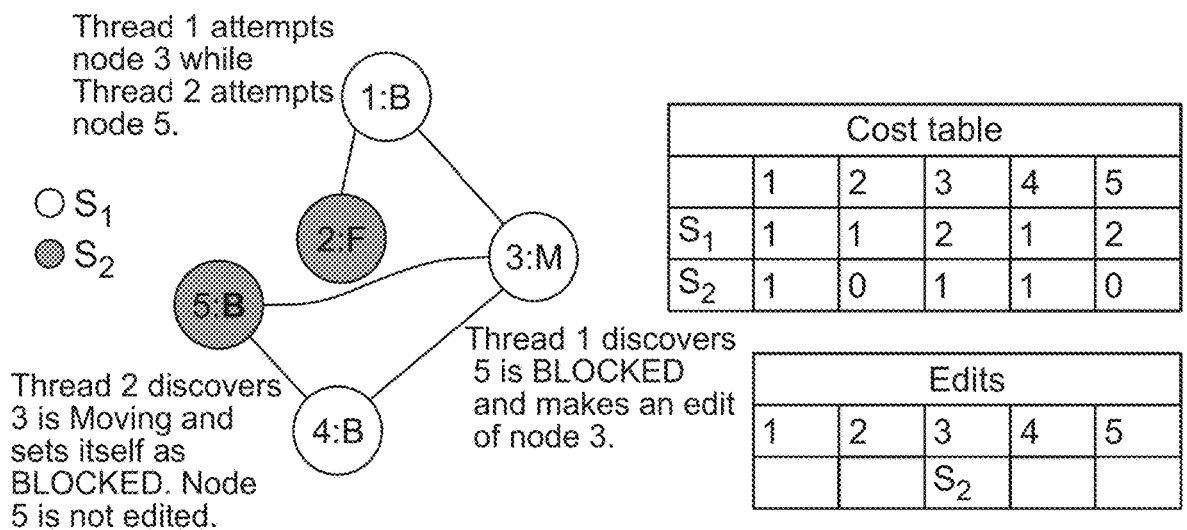

As shown in FIG. 10H, Thread 2 discovers that all its neighbors are blocked or moving and so it blocks itself (i.e., node 5, the node it is then considering) from movement. Thread 1 discovers that node 5 is blocked and proceeds to edit node 3 which was marked for movement. The edit is recorded and node 3 moves to partition 2 ($S_2$).

Figure 11:
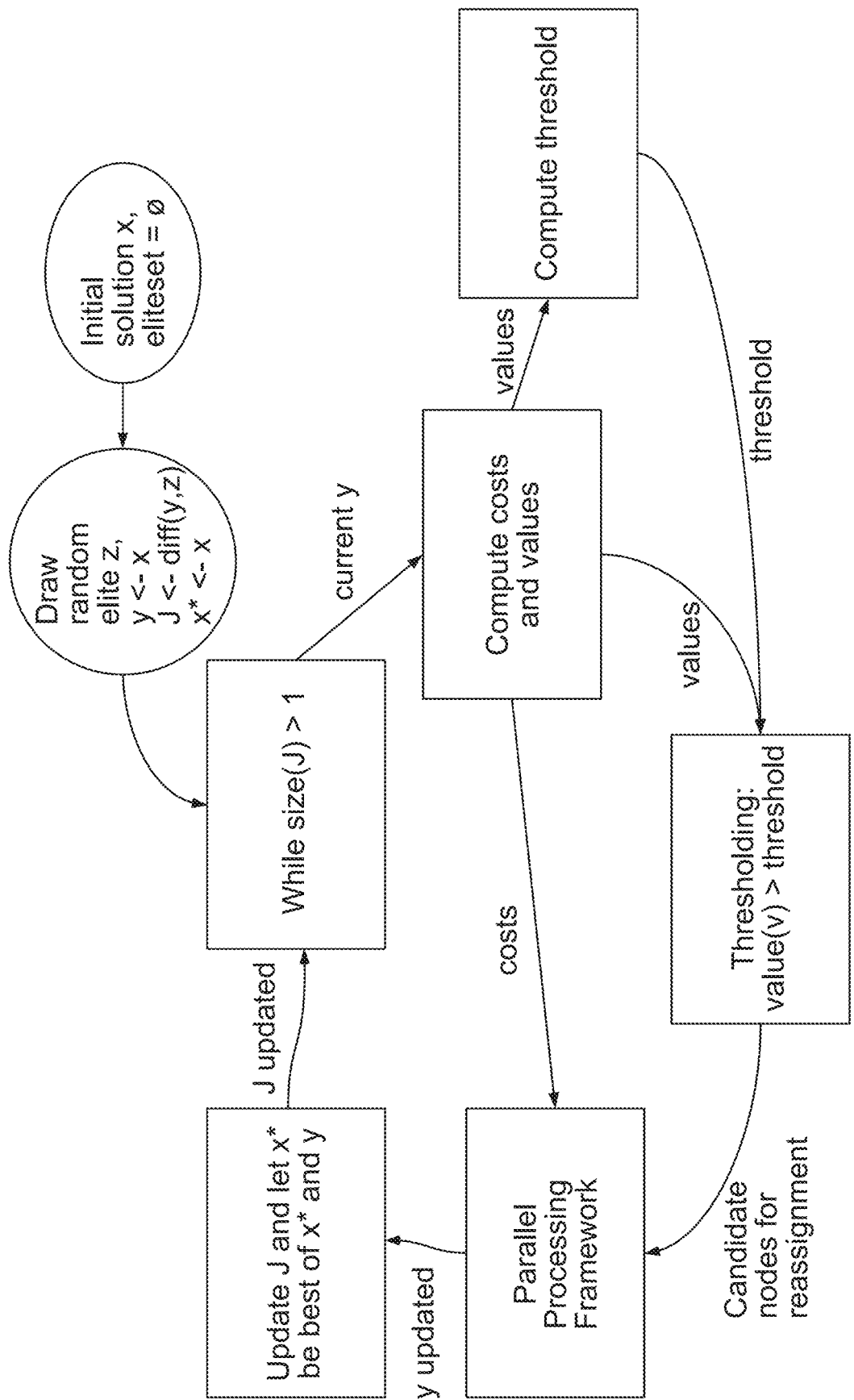
FIG. 11 illustrates an embodiment of a parallelized path relinking process.

FIG. 11 illustrates an embodiment of a parallelized path relinking process. The intuition underlying the approach is that while there exists a symmetric difference between the current and known good cut, that the PAPIG algorithm will be executed in parallel to reassign as many nodes as possible to improve the cut value of the current so that it approaches that of the known good.

In various embodiments, parallelized path relinking is performed as described in the following pseudocode:

Algorithm Parallel PR(x, elite_sets, thresholding_settings):

```
for all v {
    possible_edits[v] = z[v] // this can be represented
    compactly in practice
}
move_status atomic array of length len(nodes)
pick z at random from elite_sets
J = symmetric_difference(x, z) // should be done in parallel
x* , y = x
while (size(J) > 1) {
    costs = compute_costs_pr(y, z)
    fnodes = threshold_nodes(J, thresholding_settings, costs)
    Assign partitions of fnodes to threads
    set_all(move_status, FREE)
    each thread do {
        PAPIG(possible_edits, fnodesthread, costs, move_status, y)
    }
    if (w(y) > w(x*) {
        x* = y
    }
}
Add x* to elite_sets
return x*
```

In various embodiments, cost computations are performed to support parallelized path relinking as described in the following pseudocode:

```
compute_costs_pr(x, z)
    costs // table of shape size(V) by 2, initialized with all 0's
    values // array of length size(V)
    for v in V { // do this in parallel
        for u in N(v) {
            if (x[u] != x[v] or x[u] != z[v]) continue
            costs[v][x[u]] += w(u, v)
        }
        value[v] = costs[v][z[v]] - costs[v][x[v]]
    }
    return costs, values
```

Each of the parallelized Greedy Random Construction, Local Search and Path Relinking algorithms and/or modules can make use of a parallel processing framework (e.g., PAPIG) as disclosed herein. Although the parallel processing framework is itself serial, in various embodiments, e.g., as shown in FIG. 8 and in the PAPIG pseudocode above, parallelism is achieved by executing multiple copies of the PAPIG algorithm, for example, on processing units, each parametrized with different nodes from the graph to enable data-parallel activity.

In various embodiments, the overall cut value computed taking into account the weight of connections between subgraphs (i.e., communities) is maximized. A given connection (i.e., relationship) may have a higher or lower weight assigned to it, e.g., based on the type or other attribute of the relationship, one or more attributes of one or more nodes connected via the relationship, etc.

A graph database system configured to perform (approximate) maximum k-cuts of a graph such that the overall weight of connections between subgraphs is (approximately) maximized has been disclosed. In various embodiments, multiple and in some embodiments many threads of execution are run simultaneously on multiple computer processors to speed up the operation of the apparatus for various stages of the algorithm and its implementation. In various embodiments, the system performs one or more of the following: costs and values for greedy random construction and other processes are data-parallelized; local search around nodes that might change partition is data-parallelized; the computation of set of locally optimal solutions for relinked paths between partitions is executed in parallel; and graphs (i.e., cuts) are perturbed by reassigning as many nodes as possible that improve the cut between partitions and where the perturbation is performed via data-parallel strategy with low-cost (user level) concurrency control mechanisms for performance.

A method and high-performance apparatus for creating an approximate maximum k-cut of a graph have been disclosed. In various embodiments, nodes and weighted edges in a graph are used to compute a partitioning of a graph such that the edge weight between partitions is maximized. In various embodiments, the method and apparatus uses a greedy random construction of cuts for its first approximation, whose solutions are then subject to local search for better solutions, and local path-relinking for the final level of refinement.

Each of the greedy random construction, local search, and path relinking are themselves parallelized. Furthermore, they all make use of a novel parallel algorithm for perturbing the state of a cut to see if a better one is cheaply available. Across the board the method and apparatus permit the broad application of data-parallelism to the problem making execution on modern hardware very efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A graph database system, comprising:
a memory configured to store a graph comprising a plurality of nodes each connected to one or more other nodes via one or more relationships; and
a processor coupled to the memory and configured to assign each node to one of k communities such that a total weight of connections between the communities is approximately maximized, at least in part by performing one or more of the following in parallel via a plurality of processing threads:
making an initial assignment of each node to a community via greedy random construction;
performing local optimization to increase total weight of connections between the communities by increasing the cut value associated with each of a plurality of nodes by moving the node to a different community; and
performing path relinking to improve a current solution by making the current solution more like a previously-determined solution.

2. The system of claim 1, wherein the processor is configured to perform greedy random construction in parallel at least in part by computing in parallel one or both of costs associated with assigning nodes to a given community and values associated with nodes being assigned to a given community.

3. The system of claim 1, wherein the processor is configured to perform one or more of said greedy random construction, local optimization, and path relinking in parallel at least in part by assigning to each of a plurality of threads a different disjoint subset of the nodes comprising the graph.

4. The system of claim 1, wherein the processor is configured to perform one or more of said greedy random construction, local optimization, and path relinking in parallel at least in part by providing a queue from which each of a plurality of threads pulls nodes comprising the graph for processing by that thread.

5. The system of claim 1, wherein the processor comprises a plurality of cores and said plurality of threads are distributed across two or more cores.

6. The system of claim 1, wherein the processor is configured to perform local optimization in parallel at least in part by providing two or more threads each of which is configured to operate on a distinct subset of nodes comprising the graph, including by:
selecting for consideration a node in the subset assigned to that thread based at least in part on an indication that the node is free to be moved;
attempting to block from consideration by other threads nodes neighboring the node under consideration by setting for each node a corresponding value associated with a blocked state; and
determining to move the node to a different community based at least in part on an indication that assignment of the node to the different community is associated with a lower cost than leaving the node in a current community to which it is assigned.

7. The system of claim 6, wherein the processor is further configured to mark as blocked a node that is under consideration to be moved based at least in part on a determination that a neighbor of the node under consideration is marked to be moved.

8. The system of claim 6, wherein the processor is configured to store an indication to move the node to the different community.

9. The system of claim 8, wherein the processor is configured to recompute one or both of costs and values associated with a current solution based at least in part on an indication that all threads have completed a current iteration of local optimization.

10. The system of claim 6, wherein thread determines to move the node to the different community at least in part by searching for a move that would increase the cut value of the current solution.

11. The system of claim 1, wherein the processor is configured to perturb a partial solution produced by performing local optimization by moving each of a plurality of nodes to a different community and to perform a further pass of local optimization to see if the partial solution can be further improved.

12. The system of claim 1, wherein the total weight of connections between communities is based at least in part on the respective weight of each connection that crosses between communities.

13. A method to partition a graph comprising a plurality of nodes each connected to one or more other nodes via one or more relationships, comprising:
assigning each node to one of k communities such that a total weight of connections between the communities is approximately maximized, at least in part by performing one or more of the following in parallel via a plurality of processing threads:
making an initial assignment of each node to a community via greedy random construction;
performing local optimization to increase total weight of connections between the communities by increasing the cut value associated with each of a plurality of nodes by moving the node to a different community; and
performing path relinking to improve a current solution by making the current solution more like a previously-determined solution.

14. The method of claim 13, wherein greedy random construction is performed in parallel at least in part by computing in parallel one or both of costs associated with assigning nodes to a given community and values associated with nodes being assigned to a given community.

15. The method of claim 13, wherein one or more of said greedy random construction, local optimization, and path relinking are performed in parallel at least in part by assigning to each of a plurality of threads a different disjoint subset of the nodes comprising the graph.

16. The method of claim 13, wherein one or more of said greedy random construction, local optimization, and path relinking are performed in parallel at least in part by providing a queue from which each of a plurality of threads pulls nodes comprising the graph for processing by that thread.

17. The method of claim 13, wherein local optimization is performed in parallel at least in part by providing two or more threads each of which is configured to operate on a distinct subset of nodes comprising the graph, including by:
selecting for consideration a node in the subset assigned to that thread based at least in part on an indication that the node is free to be moved;
attempting to block from consideration by other threads nodes neighboring the node under consideration by setting for each node a corresponding value associated with a blocked state; and
determining to move the node to a different community based at least in part on an indication that assignment of the node to the different community is associated with a lower cost than leaving the node in a current community to which it is assigned.

18. A computer program product to partition a graph comprising a plurality of nodes each connected to one or more other nodes via one or more relationships, the computer program product being embodied in a non-transitory computer readable medium and comprising computer instructions for:
assigning each node to one of k communities such that a total weight of connections between the communities is approximately maximized, at least in part by performing one or more of the following in parallel via a plurality of processing threads:
making an initial assignment of each node to a community via greedy random construction;
performing local optimization to increase total weight of connections between the communities by increasing the cut value associated with each of a plurality of nodes by moving the node to a different community; and
performing path relinking to improve a current solution by making the current solution more like a previously-determined solution.

19. The computer program product of claim 18, wherein greedy random construction is performed in parallel at least in part by computing in parallel one or both of costs associated with assigning nodes to a given community and values associated with nodes being assigned to a given community.

20. The computer program product of claim 18, wherein one or more of said greedy random construction, local optimization, and path relinking are performed in parallel at least in part by assigning to each of a plurality of threads a different disjoint subset of the nodes comprising the graph.

* * * * *